US012606134B2

(12) United States Patent
Eckert

(10) Patent No.: US 12,606,134 B2
(45) Date of Patent: Apr. 21, 2026

(54) METHOD FOR DECELERATING A VEHICLE COMBINATION

(71) Applicant: ZF CV Systems Europe BV, Brussels (BE)

(72) Inventor: Horst Eckert, Rehburg-Loccum (DE)

(73) Assignee: ZF CV Systems Global GmbH, Bern (CH)

( * ) Notice: Subject to any disclaimer, the term of this patent is extended or adjusted under 35 U.S.C. 154(b) by 155 days.

(21) Appl. No.: 18/154,585

(22) Filed: Jan. 13, 2023

(65) Prior Publication Data

US 2023/0166702 A1    Jun. 1, 2023

Related U.S. Application Data

(63) Continuation of application No. PCT/EP2021/068923, filed on Jul. 8, 2021.

(30) Foreign Application Priority Data

Jul. 30, 2020    (DE) ..................... 10 2020 120 144.3

(51) Int. Cl.
  *B60T 8/32*        (2006.01)
(52) U.S. Cl.
  CPC ................................... *B60T 8/323* (2013.01)
(58) Field of Classification Search
  CPC ........ B60T 8/323; B60T 8/1708; B60T 8/321; B60T 8/327; B60T 7/22; B60T 2201/04; B60T 2210/36
  (Continued)

(56) References Cited

U.S. PATENT DOCUMENTS

| | | | |
|---|---|---|---|
| 5,496,098 A * | 3/1996 | Brearley ................. | B60T 13/66 303/9 |
| 2004/0051374 A1* | 3/2004 | Tobler ..................... | B60T 13/08 303/123 |

(Continued)

FOREIGN PATENT DOCUMENTS

| | | |
|---|---|---|
| CN | 105313864 A | 2/2016 |
| CN | 109789859 A | 5/2019 |

(Continued)

OTHER PUBLICATIONS

English machined translation of DE-102017011802-A1, Jun. 27, 2019.*

(Continued)

*Primary Examiner* — Robert A. Siconolfi
*Assistant Examiner* — San M Aung
(74) *Attorney, Agent, or Firm* — Walter Ottesen, P.A.

(57) ABSTRACT

A method decelerates a vehicle combination of a tractor vehicle and a trailer vehicle that has a trailer braking system. A brake control unit of a tractor vehicle braking system monitors the braking behavior of the tractor vehicle or vehicle combination and adjusts the brake pressure at the wheel brakes of the corresponding wheels of the tractor vehicle and a trailer brake pressure. The brake control unit detects a driver deceleration request to a retarder system and, during activation of the retarder system, monitors whether a predefined safety criterion is met, on the basis of a continually determined braking state variable. After a request to the retarder system by the driver, the stability of the vehicle combination is ensured in that, when the safety criterion is met, a portion of the deceleration request to the retarder system yet to be effectuated is effectuated by the trailer braking system.

8 Claims, 2 Drawing Sheets

(58) Field of Classification Search
USPC .......................................................... 303/123
See application file for complete search history.

(56) References Cited

U.S. PATENT DOCUMENTS

| | | | | |
|---|---|---|---|---|
| 2008/0172162 A1* | 7/2008 | Wegeng | ................... | B60T 10/02 |
| | | | | 701/70 |
| 2010/0019565 A1* | 1/2010 | Broch | ................... | B60T 8/1708 |
| | | | | 303/7 |
| 2012/0215412 A1* | 8/2012 | Seymour | ................... | B60T 7/22 |
| | | | | 701/1 |
| 2017/0259794 A1 | 9/2017 | Binder et al. | | |
| 2018/0354478 A1* | 12/2018 | Eckert | ................... | B60T 8/1708 |
| 2019/0084534 A1* | 3/2019 | Kasper | ................ | B60R 16/0315 |
| 2019/0084537 A1* | 3/2019 | Kasper | ................ | B60T 8/17551 |
| 2019/0270436 A1 | 9/2019 | Bruett et al. | | |
| 2019/0315324 A1 | 10/2019 | Eckert | | |
| 2019/0375411 A1* | 12/2019 | Öberg | ..................... | B60T 7/045 |
| 2021/0370898 A1 | 12/2021 | Eckert | | |

FOREIGN PATENT DOCUMENTS

| | | | | |
|---|---|---|---|---|
| DE | 37 36 807 A1 | 5/1989 | | |
| DE | 101 44 302 A1 | 6/2003 | | |
| DE | 10 2013 103 068 A1 | 10/2014 | | |
| DE | 10 2014 011 500 A1 | 2/2016 | | |
| DE | 10 2016 013 054 A1 | 6/2017 | | |
| DE | 102017011802 A1 * | 6/2019 | ........... | B60T 8/1708 |
| EP | 2 570 312 A1 | 3/2013 | | |
| EP | 3 533 673 A1 | 9/2019 | | |
| WO | 93/18949 A1 | 9/1993 | | |
| WO | 2008/084092 A1 | 7/2008 | | |

OTHER PUBLICATIONS

International Search Report of the European Patent Office dated Oct. 8, 2021 for international application PCT/EP2021/068923 on which this application is based.

English translation and Written Opinion of the International Searching Authority dated Oct. 8, 2021 for international application PCT/EP2021/068923 on which this application is based.

English translation and Office Action of the Chinese Patent Office dated Jun. 25, 2025 in corresponding Chinese patent application 202180058790.7.

* cited by examiner

METHOD FOR DECELERATING A VEHICLE COMBINATION

CROSS-REFERENCE TO RELATED APPLICATIONS

This application is a continuation application of international patent application PCT/EP2021/068923, filed Jul. 8, 2021, designating the United States and claiming priority from German application 10 2020 120 144.3, filed Jul. 30, 2020, and the entire content of both applications is incorporated herein by reference.

TECHNICAL FIELD

The invention relates to a method for decelerating a vehicle combination that includes a tractor vehicle and at least one trailer vehicle that has its own trailer braking system.

BACKGROUND

The tractor vehicle and the at least one trailer vehicle of the vehicle combination have pneumatically actuatable wheel brakes at each wheel. The braking effect of wheel brakes is adjustable by means of the particular brake pressure that is applied. Brake pressure is connected through to the wheel brakes of the tractor vehicle via a service brake valve of the tractor vehicle braking system as soon as a driver actuates a service brake valve by means of a brake pedal.

US 2018/0354478 and US 2019/0315324 disclose a method for decelerating a vehicle combination, wherein the trailer vehicle has its own trailer braking system. The wheel brakes of the trailer braking system are actuated via a trailer brake pressure, which is set by a tractor vehicle braking system. A brake control unit of the tractor vehicle braking system monitors the braking behavior of the tractor vehicle or of the vehicle combination and, if necessary, adjusts the particular brake pressure at the wheel brakes of the relevant wheels of the tractor vehicle and the trailer brake pressure. In the known arrangement, the brake control unit of the tractor vehicle and the brake electronics system of the trailer vehicle communicate with each other. The brake electronics system of the trailer vehicle transmits brake slip information to the brake control unit of the tractor vehicle that includes a conclusion regarding the brake slip at certain axle units. The brake control unit of the tractor vehicle ascertains a differential slip on the basis of the brake slip information of the trailer vehicle. If the evaluation of a brake slip difference reveals that braking is required at the trailer vehicle, the brake control unit of the tractor vehicle determines an appropriate trailer brake pressure, which is provided at a trailer control valve for the trailer braking system.

Retarder systems are known, in particular for commercial vehicles, which enable a prolonged and wear-free brake application without decreasing their braking power. Since a normal service brake is not suitable for continuous operation and can tend to overheat or even result in brake fade during prolonged operation, the retarder is capable of effectively reducing the load on the service brake. Essentially two types of retarder systems are used in commercial vehicles, specifically the engine brake systems on the one hand and the so-called retarder on the other hand. DE 101 44 302 A1 describes a brake device for vehicle combinations, the brake device including a service brake system and a retarder system. In order to be able to optimally use the advantage of the wear-free nature of retarders, it is provided with respect to the known brake device that, in braking operations in which the braking force of the retarder, which depends on the particular driving condition, suffices, the retarder is used primarily or exclusively. The retarder system is used together with the service brake system only in the case of stronger braking operations in which the braking force of the retarder does not suffice. In the known brake device, a monitoring unit is provided, which ascertains the maximum possible retarder braking force that is capable of being generated by the retarder as a function of the current driving condition. In the tractor vehicle of the vehicle combination, the service brake system and the retarder system are activated as a function of the current driving condition and, in fact, centrally by means of the brake pedal, wherein the braking force distribution is automatically controlled.

The request to a retarder system of the tractor vehicle by the driver can endanger the driving stability of the vehicle combination made up of multiple component vehicles in critical driving situations.

SUMMARY

It is an object of the disclosure to ensure the stability of the vehicle combination in every driving situation in a method for decelerating a vehicle combination in response to a request to a retarder system by the driver.

This object is achieved by a method wherein the brake control unit detects the deceleration request of the driver to a retarder system after the driver has manually requested deceleration by means of the retarder system by using a lever or a switching unit. During the activation of the retarder system on the basis of the deceleration request of the driver, monitoring is carried out on the basis of at least one continually determined braking state variable to determine whether at least one predefined safety criterion is met. If the safety criterion is met upon implementation of the deceleration request to the retarder system, a portion of the deceleration request to the retarder system that is yet to be effectuated is effectuated by means of the trailer braking system. A higher value than the instantaneously present braking demand of the driver is no longer output at a control unit of the retarder system. Instead, due to the safety criterion having been met, the method switches to the effectuation of the further deceleration by means of the trailer braking system. For this purpose, the brake control unit of the tractor vehicle braking system triggers the setting of an appropriate trailer brake pressure for the trailer braking system.

In one advantageous embodiment of the invention, a critical driving situation of the vehicle combination and a maximum speed intended for this driving situation are predefined as a first safety criterion, which, when met, a portion of the deceleration request to the retarder system that is yet to be effectuated is alternatively effectuated by means of the trailer braking system. The instantaneous driving speed of the vehicle combination is used as the first braking state variable for monitoring whether the safety criterion is met, and is compared to the maximum speed. If the current speed of the vehicle combination reaches the predefined maximum speed, a higher braking torque to be provided by the retarder system is no longer output at the retarder system and the portion of the deceleration requested by the driver that is yet to be effectuated is effectuated by means of the trailer braking system instead of the retarder.

As a critical driving situation for which a maximum speed for switching the portion of the deceleration request to the retarder system yet to be effectuated by means of the trailer braking system, in particular, one of the following critical driving situations is predefined:

on-going or detected incipient travel through a tighter curve, such as, for example, in an expressway exit or during travel on a winding road, on-going or detected incipient travel on a downhill grade, an ambient temperature of less than, for example, 3 degrees Celsius, a roadway that is wet or covered with snow or ice, a low axle load of that axle upon which the retarder acts in relation to a permissible axle load (empty/partially loaded), and, a relatively small mass of the tractor vehicle in relation to the permissible mass of the tractor vehicle (empty/partially loaded) and, simultaneously, a relatively high mass of the trailer vehicle.

The evaluation of the present driving situations is carried out, in particular, under consideration of the braking power of the retarder system and the driving speed of the combination at the onset of braking.

As a second braking state variable, a brake slip value of a wheel of that axle or an axle-specific brake slip value of that axle upon which the retarder system acts is detected, the brake slip value or an axle-specific brake slip value representing the wheel slip. The brake slip value, which represents the wheel slip, is compared to a limit slip value predefined as the second safety criterion. In a tractor vehicle braking system equipped with an anti-lock system, the limit slip value for meeting the safety criterion is predefined to be lower than the intervention threshold of the anti-lock system, at the slip of which the anti-lock system therefore responds. In one advantageous embodiment of the invention, the limit slip value is predefined having a certain distance to the intervention threshold for the response of the anti-lock system of the tractor vehicle braking system.

In stability-critical driving situations, the trailer braking system is activated already at a lower brake slip value of the axle of the tractor vehicle than is acted upon by the retarder and, in fact, at a brake slip value that is lower than the intervention threshold of the anti-lock system of the tractor vehicle. Therefore, a strong temporary weak braking of the vehicle combination does not occur due to the retarder having been disregarded by the anti-lock system. In addition, the trailer braking system is already activated in stability-critical driving situations in which the retarder system is disregarded by the anti-lock system, so that the requests to the driver to manage the situation are reduced. Without the method according to the invention, the driver would have to initially actuate the brake pedal in order to activate the service brake systems, wherein the tractor vehicle will generally first build up effective braking forces and, therefore, put off the trailer vehicle.

The endangerment of the driving stability of the vehicle combination is further countered when the portion of the deceleration request to the retarder system to be effectuated by means of the trailer braking system is increased upon detection of the preconditions of a predefined critical driving situation of the vehicle combination. Advantageously, a lower braking demand, which has been adapted in this case, is output to the retarder system or its control unit immediately after the onset of braking by the brake control unit of the tractor vehicle.

The surety of the vehicle stability is improved, in particular in vehicle combinations in which the trailer braking system has its own anti-lock system, wherein a brake electronics system of the trailer braking system detects brake slip values of the wheels of the trailer vehicle and transmits an information signal to the brake control unit of the tractor vehicle brake system that includes a conclusion regarding brake slip values of the trailer vehicle. In this embodiment according to the invention, the brake control unit of the tractor vehicle braking system regulates a predefined slip difference between the tractor vehicle and the trailer vehicle by adjusting the brake pressure and the trailer brake pressure. A deceleration of the vehicle combination sets in, which would have set in if the retarder system alone had decelerated the vehicle combination. If the driver carries out a braking operation of the vehicle combination by means of the retarder system, the brake control unit of the tractor vehicle braking system carries out an adaptation in order to ascertain the deceleration effect of the retarder system on the vehicle combination.

The brake control unit of the tractor vehicle bases its ascertainment of an actual brake slip difference on the brake slip information of the trailer vehicle, which is transmitted to the brake control unit via a communication link with the brake electronics system of the trailer braking system. If the evaluation of the brake slip difference based on the predefined slip difference between the tractor vehicle and the trailer vehicle reveals that braking is required at the trailer vehicle, the brake control unit of the tractor vehicle determines an appropriate trailer brake pressure.

BRIEF DESCRIPTION OF THE DRAWINGS

The invention will now be described with reference to the drawings wherein.

DETAILED DESCRIPTION

Figure 1:
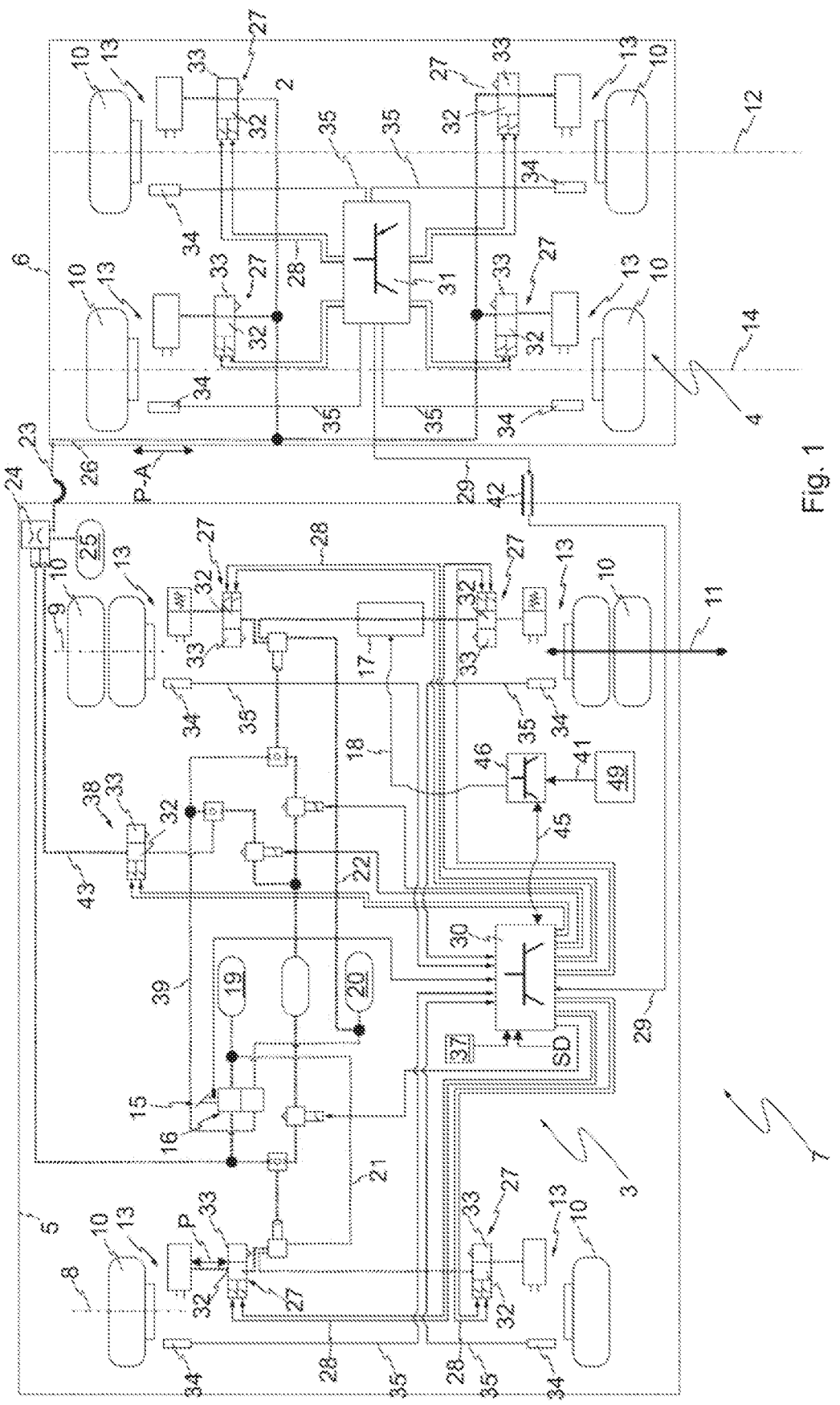
FIG. 1 shows a pneumatic and electrical schematic of the braking systems of a vehicle combination that includes a tractor vehicle and a trailer vehicle; and, FIG. 2 shows a flow diagram of an embodiment of a method for decelerating the vehicle combination according to FIG. 1.

FIG. 1 shows an electro-pneumatic diagram of the braking systems of a vehicle combination, specifically of the tractor vehicle braking system 3 of a tractor vehicle of the vehicle combination 7 and of a trailer braking system 4 of a trailer vehicle 6. In the diagram, electrical lines are represented with solid lines and pneumatic lines are represented with dashed lines. The tractor vehicle 5 in the embodiment shown has two axles 8, 9, at which wheels 10 are arranged on both sides. The trailer vehicle 6 also has two trailer axles 12, 14, each of which has wheels 10. A pneumatically actuatable wheel brake 13 is assigned to each wheel 10 for decelerating the wheels 10. The wheel brakes 13 are part of the particular service brake system of a vehicle of the vehicle combination 7.

A brake pedal 15, which is coupled to a service brake valve 16, is situated in the driver's cab of the tractor vehicle 5. The driver of the tractor vehicle 5 can open pneumatic brake lines between pressure medium supplies 19, 20 and the wheel brakes 13 by actuating the brake pedal 15.

In the embodiment shown, the wheel brakes 13 of the front axle 8 of the tractor vehicle are assigned to a shared first brake circuit 21, while the wheel brakes 13 of the rear axle 9 are actuatable via a second brake circuit 22. The first pressure medium supply 19 is assigned to the first brake circuit 21. The second brake circuit 22 of the rear axle 9 is supplied with pressure medium via a second pressure medium supply 20. The second brake circuit 22 is configured similarly to the first brake circuit 21.

A pressure control valve 27 is connected upstream from each wheel brake 13 in the tractor vehicle braking system 3 and in the trailer braking system 4, the pressure control valves 27 being electrically actuatable. The pressure control valves 27 of the tractor vehicle braking system 3 are connected to a brake control unit 30 for receiving control signals 28. The pressure control valves 27 of the trailer braking system 4 are connected to a brake electronics system 31. The pressure control valves 27 are each a combination of at least two solenoid valves, specifically an inlet valve 32 and an outlet valve 33. The inlet valve 32 is used, in principle, for increasing pressure or for holding the pressure, while the outlet valve 33 is opened in order to reduce the brake pressure and vents the particular connected brake cylinder. The inlet valve 32 and the outlet valve 33 of the pressure control valves 27 are preferably 2/2-way valves.

The tractor vehicle braking system 3 includes a coupling head 23 at which the trailer braking system 4 of the trailer vehicle 6 is coupleable. The tractor vehicle braking system 3 provides a pneumatic trailer brake pressure P-A for the trailer braking system 4 via the coupling head 23. A trailer control valve 24 is assigned to the coupling head 23, the trailer control valve 24 handling the connection between a third pressure medium supply 25 and the pneumatic coupling head 23. The trailer braking system 4 has a trailer brake circuit 26 in which the trailer brake pressure P-A prevails and is connectable through to all wheel brakes 13 of the trailer brake system 4. The actuation of the trailer control valve 24 is subject to the brake control unit 30 of the tractor vehicle braking system 3. For this purpose, the tractor vehicle braking system 3 includes a trailer pressure control valve 38, which is configured similarly to the pressure control valves 27 of the wheel brakes 13 and the inlet valve 32 and outlet valve 33, which are activated by the brake control unit 30 of the tractor vehicle brake system 3.

The brake control unit 30 and the brake electronics system 31 are configured and intended for affecting, if necessary, the brake pressure in the particular component vehicle of the vehicle combination 7. The rotational behavior of the particular wheels 10 is monitored for this purpose. A speed sensor 34 is assigned to each wheel 10 of the tractor vehicle 5 and each wheel 10 of the trailer vehicle 6, the speed sensor 34 generating measuring signals 35 that include a conclusion regarding the rotational behavior of the particular wheel 10. On the basis of the measuring signals 35 of the speed sensors 34, the particular wheel speed (reference characters v1, v2, v3, v4 in FIG. 2) is ascertained and taken into account in an anti-lock system (reference character 36 in FIG. 2) as a brake slip value that represents the wheel slip. The brake control unit 30, the speed sensors 34, and the pressure control valves 27 of the tractor vehicle braking system 3 are the essential elements of the anti-lock system 36 of the tractor vehicle braking system 3. The brake control unit 30 monitors the lockup tendency of the individual wheels 10 by means of the speed sensors 34 and the evaluation of the measuring signals 35 of the speed sensors 34. If a lockup tendency of an individual wheel 10 is detected, the brake control unit thwarts a lockup of the wheels 10 by activating one or multiple pressure control valve(s) 27 and regulating the brake pressures applied at the wheel brakes 13 along the ABS intervention threshold (reference character 44 in FIG. 2).

The trailer vehicle 6, and its trailer braking system 4, has its own anti-lock system including a brake electronics system 31, which, similarly to the brake control unit 30, monitors the lockup tendency of the wheels 10 of the trailer vehicle 6 by means of the speed sensors 34 and the evaluation of the measuring signals 35 of the speed sensors 34. Upon detection of a lockup tendency of an individual wheel 10, the brake electronics system 31 thwarts a lockup of the wheels 10 by activating one or multiple pressure control valve(s) 27 and regulating the brake pressures applied at the wheel brakes along the slip limit.

The brake control unit 30 of the tractor vehicle 5 receives a service brake request 39 and, from the service brake request 39, derives the deceleration requested by the driver of the vehicle combination 7. A brake signal emitter is coupled to the position of the brake pedal 15 in the driver's cab for this purpose. If the driver of the tractor vehicle 5 actuates the brake pedal 15, an appropriate service brake request 39 is transmitted to the brake control unit 30. On the basis of the service brake request 39, the brake control unit 30 ascertains the brake pressures to be set based on appropriate characteristic curves, which are stored in a characteristic curve memory 37.

The tractor vehicle 5 has a retarder system 17 in addition to the tractor vehicle braking system 3. In the embodiment shown, the retarder system 17 acts upon the rear axle 9 of the tractor vehicle 5. A control unit 46 is assigned to the retarder system 17. The control unit 46 and the actuators of the retarder system 17 are connected to each other by a signal line 18. Via the signal line 18, the control unit 46 of the retarder system 17 controls the actuators and effectuates braking power according to a deceleration request 41. In other words, the activation of the retarder system (reference character 54 in FIG. 2) takes place via the signal line 18, wherein status information of the retarder system 17 is simultaneously gatherable via the signal line 18 (reference character 55 in FIG. 2). An actuating lever 49 or another actuating device, by means of which the driver can operate the retarder system 17, is provided for entering the deceleration request 41 into the retarder system 17. The deceleration request 41 to the retarder system 17 can take place in a stepped or stepless manner.

The control unit 46 of the retarder system communicates with the brake control unit 30 of the tractor vehicle braking system via a signal line 45. Via the signal line 45, the brake control unit 30 receives status information 55 of the retarder system 17, for example, the permissibility of the use of the retarder via a manual request (main switch, internal block, or the like). Moreover, the status information 55 can include the nominal torque of the retarder system 17 or the status of a stepped or stepless retarder system. The current braking torque is communicated to the retarder system 17 during a braking operation. In particular, the status information 55, which is communicated by the control unit 46, includes the deceleration requested of the retarder system 17 by the driver, that is, the deceleration request 41 to the retarder system 17 predefined via the actuating lever 49.

The brake control unit 30 of the tractor vehicle braking system 3 therefore detects the manual deceleration request 41 of the driver to the retarder system 17 via the communication between the control unit 46 of the retarder system 17.

Figure 2:
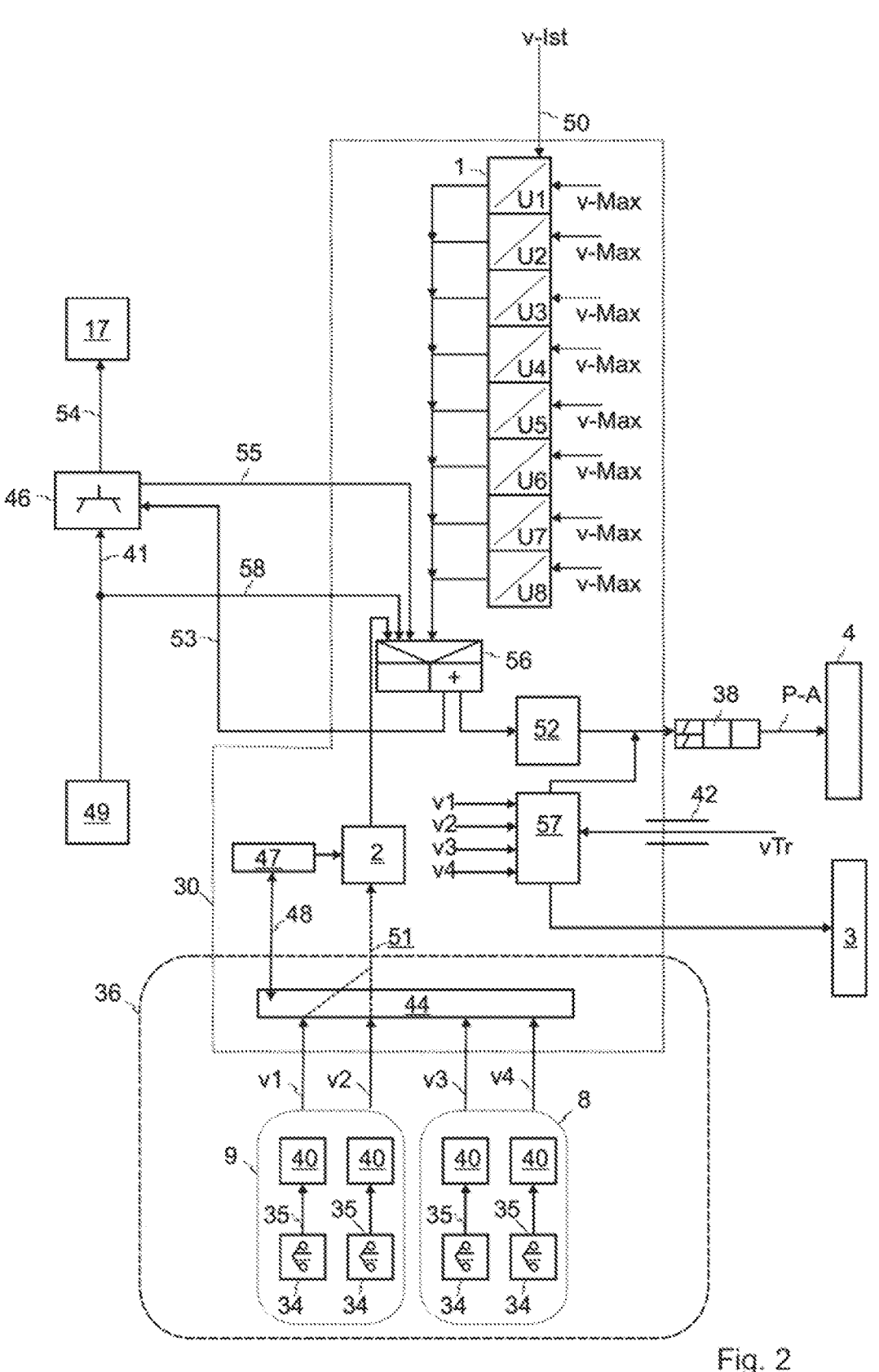

During the activation of the retarder system 17, the brake control unit 30 detects the deceleration request of the driver to the retarder system 17 and monitors the deceleration request according to the method represented in the following with reference to FIG. 2.

If the driver of the vehicle combination wants to operate the retarder system 17 and actuates the actuating lever 49, a deceleration request 41 is predefined according to the manual actuation of the control unit 46 of the retarder system 17. The control unit 46 and the retarder system 17 are connected to each other in a signal-transmitting manner via a signal line 18 (FIG. 1), so that an activation 54 of the retarder system 17 by the control unit 46 can take place. The activation 54 of the retarder system 17 takes place as a function of the deceleration request 41.

The brake control unit 30 of the tractor vehicle braking system is configured for detecting 58 the deceleration request 41 to the retarder system 17. After detection 58 of the deceleration request, a monitoring 56 is carried out on the basis of at least one continually determined braking state variable 50, 51 to determine whether at least one predefined safety criterion 1, 2 is met. If one of the predefined safety criteria 1, 2 has been met, a portion 52 of the deceleration request 41 to the retarder system 17 that is yet to be effectuated is effectuated by means of the trailer braking system 4. When the safety criterion 1, 2 is met, the brake control unit 30 effectuates a limitation of the deceleration to be effectuated by the retarder system 17. This means that the control unit 46 of the retarder system 17 does not request further deceleration in the case of the limitation 53 of the retarder system 17 and the portion 52 of the deceleration request 41 to the retarder system 17 that is yet to be effectuated is effectuated by means of the trailer braking system 4. For this purpose, the brake control unit 30 provides a trailer brake pressure P-A via the trailer pressure control valve 38, the trailer brake pressure P-A corresponding to the portion 52 of the deceleration request 41 yet to be effectuated.

One or multiple critical driving situation(s) of the vehicle combination 7 is/are predefined as a first safety criterion 1. In the embodiment shown, multiple critical driving situations U1, U2, U3, U4, U5, U6, U7, U8 of the vehicle combination are taken into account, wherein a specific maximum speed v-Max is predefined for each of these driving situations U1, U2, U3, U4, U5, U6, U7, U8. In the embodiment shown, a first critical driving situation U1 is on-going or detected incipient travel through a curve, in particular through a tighter curve, such as, for example, in an expressway exit or during travel on a winding road. Ongoing or detected incipient travel on a downhill grade is provided as a second critical driving situation U2. The critical driving situations can also be made dependent upon an ambient temperature, so that a certain ambient temperature, for example, less than +3 degrees Celsius, is predefined as a further critical driving situation U3. A wet roadway, or a roadway covered with snow or ice is provided as a further critical driving situation U4. Preferably, in addition, the axle load of the rear axle 9 of the tractor vehicle 5 acted upon by the retarder system 17 is taken into account as the critical driving situation U5. Here, the load state of the tractor vehicle is taken into account, that is, the safety criterion 1 accounts for the axle load of the rear axle 9 of the tractor vehicle acted upon by the retarder system 17 in relation to the maximum permissible axle load of the rear axle 9. As a further critical driving situation U6, the mass of the tractor vehicle 5 of the vehicle combination 7 in relation to the permissible mass of the tractor vehicle 5 in combination with a simultaneously relatively high mass of the trailer vehicle 6 is taken into account.

The critical driving situations are predefined, in particular, under consideration of the braking power of the retarder 17. Moreover, the evaluation of a driving situation considers the driving speed of the vehicle combination 7 at the onset of braking to be critical and this is considered to be that much more critical, the higher the driving speed of the vehicle combination 7 is for the particular current driving situation.

The instantaneous driving speed v-Ist of the vehicle combination 7 is taken into account as the continually determined braking state variable 50 for monitoring 56 and evaluating the critical driving situations U1, U2, U3, U4, U5, U6, U7, U8 of the vehicle combination 7 predefined as the first safety criterion 1.

As a second braking state variable 51, a brake slip value v2 of that axle 11 upon which the retarder system 17 acts is detected, the brake slip value v2 representing the wheel slip. This axle, upon which the retarder system 17 acts, is the rear axle 9 of the tractor vehicle 5 in the embodiment shown. The brake slip value v2 is detected via speed sensors 34 at the wheels of the relevant axle. Preferably, the brake slip value v2 taken into account as the second braking state variable 51 is provided by an anti-lock system 36 of the tractor vehicle braking system 3. The brake slip value v2 used as the second braking state variable 51 is compared to a limit slip value 47 predefined as a second safety criterion 2. If the braking state variable 51 reaches or exceeds the limit slip value 47, the deceleration request 41 to the retarder system 17 is divided, that is, a limitation 53 of the current deceleration request to the retarder system 17 and provision of a trailer brake pressure P-A according to the portion 52 of the deceleration request 41 to the retarder system 17 yet to be effectuated, so that the portion 52 of the deceleration request 41 yet to be effectuated is effectuated by means of the trailer braking system 4.

The limit slip value 47 is predefined as having a distance 48 to an intervention threshold 44 for the response of the anti-lock system 36 of the tractor vehicle braking system 3. In this way, it is ensured that a limitation 53 of the deceleration request 41 to the retarder system 17 takes place in a timely manner before the engagement of the anti-lock system 36.

The braking electronics system of the trailer braking system 4 continually communicates brake slip values vTr of the trailer vehicle to the brake control unit 30 of the tractor vehicle brake system 3 via the communication link 42 between the tractor vehicle 5 and the trailer vehicle 6. The brake slip values of the trailer vehicle 6 are continually ascertained by the brake electronics system via evaluation of the measuring signals of the speed sensors 34 at the wheels of the trailer vehicle 6. The brake slip value vTr of the trailer vehicle 6 is advantageously ascertained by an anti-lock system of the trailer vehicle 6, in particular by ascertaining the brake slip values of individual wheels or axles of the trailer vehicle 6.

The brake control unit 30 of the tractor vehicle braking system carries out a braking force distribution 57 on the basis of the detected brake slip value vTr of the trailer vehicle 6 and the brake slip values v1, v2, v3, v4 of the tractor vehicle 5. Brake pressures P in the tractor vehicle braking system 3 and the trailer brake pressure P-A for the trailer braking system 4 are ascertained and provided according to the braking force distribution 57 onto the tractor vehicle braking system 3 and the trailer braking system 4 and individual axles of the particular vehicle 5, 6 of the vehicle combination 7. The brake control unit 30 regulates the predefined slip difference (reference character SD in FIG. 1) between the tractor vehicle 5 and the trailer vehicle 6 via the adjustment of the brake pressure P and of the trailer brake pressure P-A.

If the vehicle combination 7 has more than one trailer vehicle 6, an activation of the trailer braking systems and a regulation of the slip difference SD takes place in such a way that each trailer vehicle 6 within the vehicle combination 7 has an averaged brake slip value, which is equal to or greater than the brake slip value of that trailer vehicle 6 that travels closer to the tractor vehicle 5 with respect to the relevant trailer vehicle. The objective of the slip difference and of the braking force distribution can be that all component vehicles of the vehicle combination 7, in particular the trailer vehicles 6, each have the same brake slip values vTr.

It is understood that the foregoing description is that of the preferred embodiments of the invention and that various changes and modifications may be made thereto without departing from the spirit and scope of the invention as defined in the appended claims.

LIST OF REFERENCE CHARACTERS (COMPONENT OF THE DESCRIPTION)

1. first safety criterion
2. second safety criterion
3. tractor vehicle braking system
4. trailer braking system
5. tractor vehicle
6. trailer vehicle
7. vehicle combination
8. front axle
9. rear axle
10. wheel
11. axle with retarder
12. trailer axle, rear
13. wheel brake
14. trailer axle, front
15. brake pedal
16. service brake valve
17. retarder system
18. signal line
19. pressure medium supply
20. pressure medium supply
21. first brake circuit
22. second brake circuit
23. coupling head
24. trailer control valve
25. pressure medium supply
26. trailer brake circuit
27. pressure control valve
28. control signal
29. information signal
30. brake control unit
31. brake electronics system
32. inlet valve
33. outlet valve
34. speed sensor
35. measuring signal
36. anti-lock system
37. characteristic curve memory
38. trailer pressure control valve
39. service brake request
40. evaluation
41. retarder deceleration request
42. communication link (CAN)
43. trailer brake pressure line
44. ABS intervention threshold
45. signal line
46. retarder system control unit
47. limit slip value
48. distance
49. retarder actuating lever
50. first braking state variable 51. second braking state variable
52. portion of deceleration request
53. limitation of deceleration request
54. activation of retarder
55. status information of the retarder system
56. monitoring
57. braking force distribution
58. detection
U1 driving situation
U2 driving situation
U3 driving situation
U4 driving situation
U5 driving situation
U6 driving situation
U7 driving situation
U8 driving situation
Vmax maximum speed
P brake pressure
P-A trailer brake pressure
V1 brake slip value
V2 brake slip value
V3 brake slip value
V4 brake slip value
vTr trailer brake slip value
SD slip difference

The invention claimed is:

1. A method for decelerating a vehicle combination including a tractor vehicle operated by a driver and at least one trailer vehicle having a trailer braking system, the tractor vehicle including a tractor vehicle braking system having a brake control unit for monitoring braking behavior of the tractor vehicle or of the vehicle combination and, as needed, for adjusting a brake pressure at wheel brakes of affected wheels of the tractor vehicle and a trailer brake pressure; the method comprising the steps of:

detecting a deceleration request of the driver via the brake control unit to a retarder system and, during activation of the retarder system, monitoring via the brake control unit whether at least one predefined safety criterion is met based on at least one continually determined braking state variable, wherein the deceleration request of the driver is manually requested to the retarder system;

when the safety criterion is met effectuating via the trailer braking system a portion of the deceleration request to the retarder system that has yet to be effectuated;

wherein the trailer braking system includes a brake electronics system, and wherein:

the brake electronics system of the trailer braking system detects brake slip values of the wheels of the at least one trailer vehicle;

the brake control unit of the tractor vehicle braking system ascertains an information signal that includes a conclusion regarding the brake slip values of the at least one trailer vehicle; and, the brake control unit regulates a predefined slip difference between the tractor vehicle and the at least one trailer vehicle by adjusting the brake pressure and the trailer brake pressure.

2. The method of claim 1, further comprising the steps of:

stipulating, as a first safety criterion, a critical driving situation of the vehicle combination and a maximum speed predetermined for the critical driving situation; and, applying the speed of the vehicle combination as a first braking state variable and comparing the speed of the vehicle combination to a maximum speed.

3. The method of claim 2, further comprising the step of detecting, as a second braking state variable, one of:

i) a brake slip value of a wheel of that axle upon which said retarder system acts; or, ii) an axle-specific brake slip value of that axle upon which said retarder system acts;

the brake slip value representing a wheel slip; and, comparing the brake slip value to a limit slip value predefined as a second safety criterion.

4. The method of claim 3, wherein said limit slip value is predefined as having a distance to an intervention threshold for the response of an anti-lock system of the tractor vehicle braking system.

5. The method of claim 1, wherein the request of the driver is manually requested via at least one of a lever and a switching unit.

6. The method of claim 1, wherein the request of the driver is manually requested via a control unit of the retarder system.

7. A method for decelerating a vehicle combination including a tractor vehicle operated by a driver and at least one trailer vehicle having a trailer braking system, the tractor vehicle including a tractor vehicle braking system having a brake control unit for monitoring braking behavior of the tractor vehicle or of the vehicle combination and, as needed, for adjusting a brake pressure at wheel brakes of affected wheels of the tractor vehicle and a trailer brake pressure; the method comprising the steps of:

detecting a deceleration request of the driver via the brake control unit to a retarder system and, during activation of the retarder system, monitoring via the brake control unit whether at least one predefined safety criterion is met based on at least one continually determined braking state variable, wherein the deceleration request of the driver is manually requested to the retarder system;

when the safety criterion is met effectuating via the trailer braking system a portion of the deceleration request to the retarder system that has yet to be effectuated;

wherein the deceleration request of the driver to the retarder system does not result from any deceleration request to the tractor vehicle braking system;

wherein the trailer braking system includes a brake electronics system, and wherein:

the brake electronics system of the trailer braking system detects brake slip values of the wheels of the at least one trailer vehicle;

the brake control unit of the tractor vehicle braking system ascertains an information signal that includes a conclusion regarding the brake slip values of the at least one trailer vehicle; and, the brake control unit regulates a predefined slip difference between the tractor vehicle and the at least one trailer vehicle by adjusting the brake pressure and the trailer brake pressure.

8. A method for decelerating a vehicle combination including a tractor vehicle operated by a driver and at least one trailer vehicle having a trailer braking system, the tractor vehicle including a tractor vehicle braking system having a brake control unit for monitoring braking behavior of the tractor vehicle or of the vehicle combination and, as needed, for adjusting a brake pressure at wheel brakes of affected wheels of the tractor vehicle and a trailer brake pressure; the method comprising the steps of:

detecting a deceleration request of the driver via the brake control unit to a retarder system and, during activation of the retarder system, monitoring via the brake control unit whether at least one predefined safety criterion is met based on at least one continually determined braking state variable, wherein the deceleration request of the driver is manually requested to the retarder system;

when the safety criterion is met effectuating via the trailer braking system a portion of the deceleration request to the retarder system that has yet to be effectuated; and, further comprising, when the safety criterion is met, effectuating a limitation of the deceleration request of the driver to the retarder system;

wherein the trailer braking system includes a brake electronics system, and wherein:

the brake electronics system of the trailer braking system detects brake slip values of the wheels of the at least one trailer vehicle;

the brake control unit of the tractor vehicle braking system ascertains an information signal that includes a conclusion regarding the brake slip values of the at least one trailer vehicle; and, the brake control unit regulates a predefined slip difference between the tractor vehicle and the at least one trailer vehicle by adjusting the brake pressure and the trailer brake pressure.

\* \* \* \* \*